March 26, 1957 H. A. SHERWOOD 2,786,559

SOUND RECORDING AND/OR REPRODUCING DEVICE

Filed Nov. 17, 1955

INVENTOR.
Henry A. Sherwood
BY
Munn, Liddy, Nathanson & March
ATTORNEYS

United States Patent Office 2,786,559

Patented Mar. 26, 1957

2,786,559

SOUND RECORDING AND/OR REPRODUCING DEVICE

Henry A. Sherwood, Woodbridge, Conn., assignor to Infra Electronic Corporation, Roseland, N. J., a corporation of New York Application November 17, 1955, Serial No. 547,354

6 Claims. (Cl. 192—9)

This invention relates to sound recording and reproducing equipment, and more particularly to dictating machines such as are commonly used in business.

Present day dictating machines utilize various types of record media, on which the information is recorded either in the form of physical undulations or impressions, or magnetic flux patterns or the like.

In the use of these dictating machines it is of the greatest importance to effect rapid starting and halting of the record medium, since it eliminates distortion, speeds up the dictation procedure and conserves space on the record, particularly when pauses occur in the dictation, corrections are to be made, etc.

An object of the present invention is to provide an improved and simplified means for quickly starting or stopping the record medium, in a dictating or similar machine.

Another object of the invention is to provide, in a dictating machine wherein a turntable is provided for driving the record medium, an improved means for quickly starting or stopping the turntable.

A feature of the invention resides in the provision of an improved starting and stopping mechanism as above set forth, which has few and simple parts, is economical to manufacture, and is nevertheless effective and reliable in its operation throughout an extended period of use.

Other features and advantages will hereinafter appear.

In the drawings accompanying this specification, similar characters of reference indicate corresponding parts wherever possible in the several views, in which.

Figure 1:
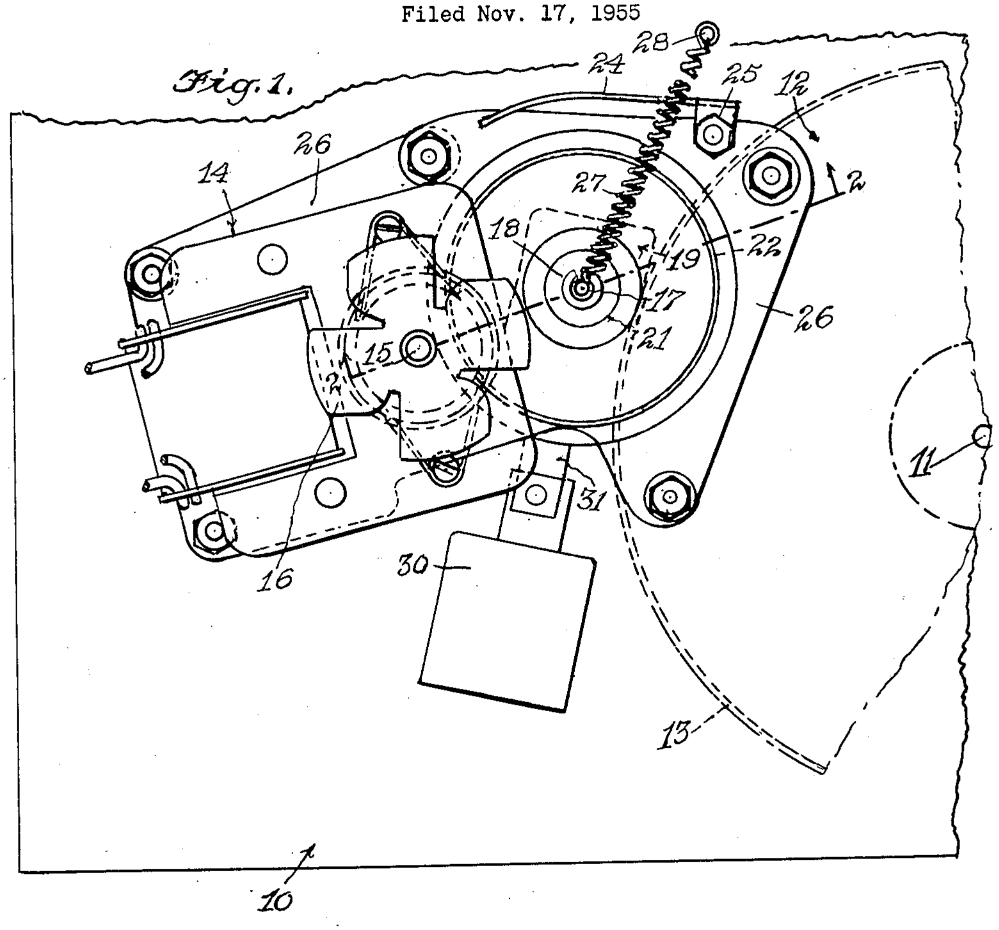
Figure 1 is a top or plan view of a drive mechanism for the record medium of a dictating machine, incorporating the improved start-and-stop means of the invention.

Referring to the figures, a dictating machine is shown comprising a frame or base 10 having a vertical shaft 11 on which a disk or turntable 12 is mounted for rotation in a horizontal plane. The turntable 12 preferably has the usual depending flange 13 by which it is adapted to be frictionally driven from a motive means.

Also mounted on the frame 10 is a usual type of electric motor 14 having a drive shaft 15 connected with a rotor or armature 16.

In accordance with the present invention I provide a novel and improved transmission means for driving the turntable 12, said means being so organized and arranged as to effect virtually instantaneous starting and stopping of the turntable. In accomplishing this, referring to Figures 1 and 2, I provide a jack shaft 17 mounted in bearings 18 carried by a bearing bracket 19 which is arranged to have a slight curvilinear movement circumferentially of the turntable 12. For such purpose, the bearing bracket 19 may engage a guide 20 by which the shaft 17 is maintained vertical at all times (perpendicular to the plane of the frame 10) while still being movable laterally in an arcuate path following and spaced from the friction flange 13 of the turntable 12.

The shaft 17 carries a friction wheel 21 which is maintained continuously in engagement with the flange 13 of the turntable 12 at all times. Thus the turntable will be driven in response to turning of the wheel 21. Secured to the friction wheel 21 is a second and larger-diameter friction wheel 22 which is adapted to engage the drive shaft 15 of the motor 14, to be driven thereby. By virtue of the mounting of the shaft 17, the latter and the wheels 21 and 22 may be shifted upward and slightly to the right as viewed in Figure 1, whereby the large friction wheel 22 will become disengaged from the motor drive shaft 15 while the small friction wheel 21 remains engaged with the turntable flange 13.

In accordance with this invention, in the path of movement of the large friction wheel 22 I provide a braking member 24 in the form of a sheet metal arm secured by means of a bracket 25 to a sub-base 26 which carries the motor 14 and guide 20. I further provide a helical extension spring 27 secured at one end to a pin 28 carried by the base 10, the other end of the extension spring 27 being connected with the shaft 17 so as to normally urge the latter and the friction wheels carried thereby upward and to the right as viewed in Figure 1. Movement of the shaft 17 and friction wheels in response to urging of the spring 27 will cause engagement of the wheel 22 with the braking member 24, thereby to virtually instantly halt turning of the wheels and shaft.

Figure 2:
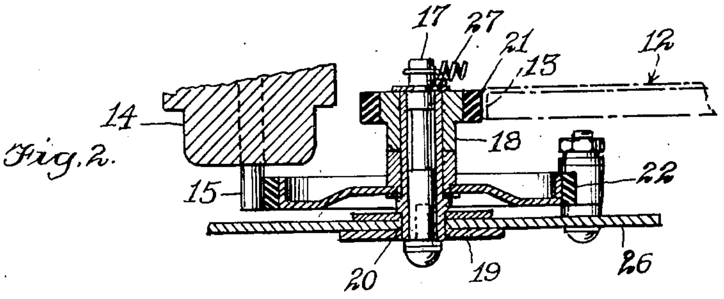
Figure 2 is a view partly in vertical section and partly in side elevation, taken on line 2—2 of Figure 1.

For the purpose of maintaining the shaft 17 and friction wheels in operative position I provide, in accordance with the invention, an electrical means in the form of a solenoid 30 mounted on the base 10 and having a plunger 31 operatively connected with the bearing bracket 19, as shown in Figure 2. When the solenoid 30 is energized it will either shift or hold the bearing bracket 19 together with the shaft 17 and wheels 21 and 22 downward against the action of the spring 27, maintaining the parts in downward shifted operative positions as shown in Figure 1 wherein the friction wheel 22 is engaged and driven by the drive shaft 15 of the motor 14.

The motor 14 may be allowed to run continuously whenever the machine is being used, or it may be connected in parallel with the solenoid 30 so as to run only at such times that the solenoid is energized.

Operation of the improved stop-and-start drive for the turntable is as follows. With the motor 14 and solenoid 13 both energized, the motor will drive the friction wheel 22, causing rotation of the friction wheel 21, which in turn drives the turntable 12 by virtue of engagement with the flange 13 thereof. When it is desired to quickly halt the turntable 12 the solenoid 30 is deenergized. (If desired the motor 14 may also be deenergized, or it may not, depending on conditions of use.) Deenergization of the solenoid 30 enables the spring 27 to be immediately operative, whereupon it will quickly shift upward and to the right (as viewed in Figure 1) the bearing bracket 19, shaft 17, and friction wheels 21 and 22. The large friction wheel 22 will be thus quickly brought in contact with the brake member 24 and especially due to its large diameter the wheel 22 will be immediately halted. This will cause the friction wheel 21 and the turntable 12 driven thereby to be immediately halted, since the friction wheel 21 remains at all times in driving engagement with the turntable. When it is desired to again start the turntable, the solenoid 30 is energized (and the motor 14 energized if it has been previously deenergized). The shaft 17 and wheels 21 and 22 will be again shifted downward, effecting a drive of the turntable 12 from the motor 14 as hereinbefore described.

It will be readily seen from the above that I have provided a novel and improved driving mechanism by which the turntable 12 may be quickly started and quickly halted in accordance with the desires of the operator. Thus, in dictation, the turntable may be instantly halted for those periods during which nothing is being spoken, thereby saving valuable space on the record medium and preventing distortion of the recorded matter. I have found that the speed of response of my improved mechanism as above set forth is so great that a word may be split or spoken in syllables separated by an interval of time during which the turntable is made to halt, and upon playback the split in the word will be virtually unnoticeable. Moreover, the mechanism is extremely simple, reliable in its operation, and economical to manufacture.

While the invention has been described in some detail, it will be understood that variations and modifications may be made without departing from the spirit of the invention or the scope of the appended claims.

I claim:

1. In a dictating machine, a turntable mounted for rotary movement, said turntable having a large-diameter friction-drive peripheral portion; a power-driven shaft; a stationary brake member; a first idler wheel of relatively small diameter; a second idler wheel rigid with the first wheel and having a relatively large diameter; and means providing a bearing for the said idler wheels and movably mounting the wheels for placement either in a driving position wherein the small-diameter wheel engages the peripheral portion of turntable and the large-diameter wheel engages the power-driven shaft to cause rotation of the turntable, or a braking position wherein the large-diameter wheel disengages the shaft and engages the brake member, thereby to quickly and effectively halt the turntable.

2. The invention as defined in claim 1 in which the means mounting the idler wheels maintains the small-diameter wheel constantly in engagement with the turntable.

3. The invention as defined in claim 1 in which there is electrically-operated means for holding the idler wheels in driving position, and in which there is spring means for moving the idler wheels to and holding them in the braking position when said electrically-operated means is deenergized.

4. The invention as defined in claim 3 in which the electrically-operated means comprises a solenoid.

5. The invention as defined in claim 1 in which the means providing the bearing for the idler wheels comprises a shaft on which the wheels turn, and a support mounting the shaft for movement laterally thereof.

6. In a machine for recording and/or reproducing sound, a record medium movable along a predetermined path and having a friction driving surface; a powder driven shaft; a stationary brake member; a first idler wheel of relatively small diameter; a second idler wheel rigid with the first wheel and having a relatively large diameter; and means which provides a bearing for the idler wheels and movably mounts the wheels for placement either in a driving position wherein the small-diameter wheel engages the driving surface of the record medium and the large-diameter wheel engages the power driven shaft to cause movement of said medium, or a braking position wherein the large-diameter wheel disengages the shaft and engages the brake member, thereby to quickly and effectively halt the record medium.

References Cited in the file of this patent

UNITED STATES PATENTS

| | | |
|---|---|---|
| 2,181,318 | Fessenden | Nov. 28, 1939 |
| 2,625,827 | Hartman | Jan. 30, 1953 |
| 2,694,110 | Roberts | Nov. 9, 1954 |
| 2,714,010 | Gruber et al. | July 26, 1955 |